United States Patent
Ben Fredj et al.

(10) Patent No.: US 6,810,952 B2
(45) Date of Patent: Nov. 2, 2004

(54) VEHICLE AIR-CONDITIONING DEVICE INCLUDING A MULTI-PURPOSE HEAT EXCHANGER

(75) Inventors: Mounir Ben Fredj, Tokyo (JP); Bruno Hamery, Paris (FR); Jean-Luc Thuez, St Germain en Laye (FR); Noureddine Khelifa, Coburg (DE)

(73) Assignee: Valeo Climatisation, La Verriere (FR)

( * ) Notice: Subject to any disclaimer, the term of this patent is extended or adjusted under 35 U.S.C. 154(b) by 51 days.

(21) Appl. No.: 09/803,735

(22) Filed: Mar. 12, 2001

(65) Prior Publication Data

US 2001/0037873 A1 Nov. 8, 2001

(30) Foreign Application Priority Data

Mar. 10, 2000 (FR) .............................. 00 03126

(51) Int. Cl.[7] .......................... F25B 29/00; B60H 1/00; B60H 3/00
(52) U.S. Cl. ...................... 165/202; 165/240; 165/140; 165/42; 165/43; 62/199; 62/200; 62/238.6; 62/238.7; 62/239; 237/12.3 A; 237/12.3 B; 237/2 A; 237/2 B
(58) Field of Search .......................... 165/202, 42, 43, 165/140, 240; 62/199, 200, 238.6, 238.7, 239; 237/12.3 A, 12.3 B, 2 A, 2 B

(56) References Cited

U.S. PATENT DOCUMENTS

| 2,215,327 | A | * | 9/1940 | Karsten | 62/200 |
|---|---|---|---|---|---|
| 2,264,171 | A | * | 11/1941 | Steinfeld | 62/200 |
| 2,328,472 | A | * | 8/1943 | Lehane et al. | 62/200 |
| 2,801,827 | A | * | 8/1957 | Dolza | 165/43 |
| 3,007,321 | A | * | 11/1961 | Krayer | 62/199 |
| 4,616,484 | A | * | 10/1986 | Mehdi et al. | 62/238.6 |
| 4,648,247 | A | | 3/1987 | Takizawa et al. | 62/256 |
| 4,807,445 | A | * | 2/1989 | Matsuoka et al. | 62/225 |
| 6,105,387 | A | * | 8/2000 | Hong et al. | 62/199 |

FOREIGN PATENT DOCUMENTS

| DE | 3820811 | | 12/1989 | | |
|---|---|---|---|---|---|
| EP | 0964218 A2 | * | 12/1999 | | |
| GB | 2150278 | | 6/1985 | | |
| JP | 54-23240 | * | 2/1979 | | 62/199 |
| JP | 54-104636 | * | 8/1979 | | 237/12.3 A |
| JP | 58-183312 | * | 10/1983 | | 62/200 |
| JP | 59-143716 | * | 8/1984 | | |
| JP | 06-207763 | * | 7/1994 | | |
| JP | 54-34157 | * | 3/1997 | | 62/200 |
| JP | 10-311615 | * | 11/1998 | | |

OTHER PUBLICATIONS

Patent Abstracts of Japan, Pub. No 60148716, Pub. Date Aug. 6, 1985.

* cited by examiner

*Primary Examiner*—John K. Ford
(74) *Attorney, Agent, or Firm*—Liniak, Berenato & White

(57) ABSTRACT

A refrigerant-fluid circuit has a compressor, a condenser serving as heat sink and a first evaporator serving as cold source. The circuit also has a second evaporator and the refrigerant fluid is made to flow either only in the first evaporator, or in the two evaporators, depending on the cooling power required.

9 Claims, 5 Drawing Sheets

VEHICLE AIR-CONDITIONING DEVICE INCLUDING A MULTI-PURPOSE HEAT EXCHANGER

FIELD OF THE INVENTION

The invention relates to the air-conditioning of the passenger compartment of motor vehicles.

BACKGROUND OF THE INVENTION

Reliance is often placed, for this function, on a refrigerant-fluid circuit including a compressor, a condenser serving as heat sink, a pressure-reducing valve and a first evaporator serving as cold source.

The object of the invention is to enhance the production of cold for a given size of the cold source.

The invention especially envisages a device for air-conditioning the passenger compartment of a motor vehicle, comprising a refrigerant-fluid circuit including a compressor, a condenser serving as heat sink and a first evaporator serving as cold source.

SUMMARY OF THE INVENTION

According to the invention there is provided a device for air-conditioning the passenger compartment of a motor vehicle, comprising a refrigerant-fluid circuit including a compressor, a condenser serving as heat sink and a first evaporator serving as cold source, and further comprising a second evaporator and switching means for making the fluid flow either only in the first evaporator, or in the two evaporators, depending on the required cooling power, the first and second evaporators being traversed one after the other at least partly by an airflow to be cooled.

The replacement of a single evaporator by two evaporators with a total volume at most equal to the volume of the single evaporator promotes the removal of the condensates originating from moist air, thus reducing the thickness of the film of water which forms an obstacle to the heat exchange between the air and the refrigerant fluid and which causes a loss of pressure head in the airflow. The production of cold is thus increased.

The invention, moreover, facilitates management of the cooling power by putting the two evaporators or only one of them in service as required.

Optional characteristics of the invention, which are complementary or alternative, are set out below:

the switching means are able, moreover, to make the fluid flow only in the second evaporator;

the switching means are able to make the fluid flow alternately in the first and second evaporators;

the first and second evaporators have different cold-production capacities;

the switching means include means for making the fluid flow in an additional heating loop containing the second evaporator and not containing the condenser nor the first evaporator, the second evaporator then serving as heat source;

the additional heating loop contains, between the outlet of the second evaporator and the inlet of the condenser, a pressure-reducing valve in parallel with bypass means which can be closed off, allowing the fluid to pass through this pressure-reducing valve when the second evaporator is serving as heat source and to avoid it when the second evaporator is serving as cold source;

the said circuit includes a unit module linked to the inlet of the compressor, to the outlet of the condenser, to the inlet and to the outlet of the first evaporator, to an external junction point situated between the outlet of the compressor and the inlet of the second evaporator and to the outlet of the latter, the said module containing at least one anti-return valve arranged between the outlet of the first evaporator and the inlet of the compressor, an internal junction point linked to the outlet of the condenser, a first pressure-reducing valve interposed between the internal junction point and the inlet of the first evaporator, and a stop valve and a second pressure-reducing valve which are interposed between the internal junction point and the inlet of the second evaporator;

the additional heating loop further contains, between the second evaporator and the compressor, a pressure-reducing valve followed by a supplementary heat exchanger able to extract heat from an outside environment, and operates as heat pump;

means are provided for allowing the fluid to circumvent the supplementary heat exchanger and the associated pressure-reducing valve when it is flowing in the two evaporators;

the switching means are able to make the fluid leaving the compressor flow first of all in the second evaporator, which then plays the role of condenser, then in two branches, in parallel, respectively containing the first evaporator and the condenser, which then plays the role of evaporator, before bringing it back to the compressor;

the two evaporators, as cold sources, are arranged mutually in parallel in the circuit;

the two evaporators, as cold sources, are arranged mutually in series in the circuit;

the circuit further includes means for setting the throughput and/or the pressure of the fluid sent into the evaporators as a function of the pressure and/or of the temperature of the fluid leaving one and/or the other of the evaporators;

one of the first and second evaporators forms, with a radiator for heating the passenger compartment, a compound heat exchanger in which an airflow to be cooled or to be heated is in thermal contact both with the refrigerant fluid of the said circuit and with a heat-carrying fluid supplying the said radiator;

the said compound heat exchanger comprises two fluid chambers supplied respectively with refrigerant fluid and with heat-carrying fluid, which are arranged at opposite ends to one another with respect to a bank of tubes, each tube having a U-shaped configuration in which the ends of the two branches communicate with one of the fluid chambers, in such a way as to be traversed by the corresponding fluid, this fluid being alternately the refrigerant fluid and the heat-carrying fluid in the direction of the airflow;

one of the first and second evaporators forms, with a first heat exchanger in which a heat-carrying fluid flows, a compound heat exchanger in which the said refrigerant fluid exchanges heat with the said heat-carrying fluid, the latter also flowing in a second heat exchanger intended to heat or to cool a region of the passenger compartment other than that receiving the said airflow, and/or in a reservoir allowing storage of heat or of cold;

the first evaporator, a radiator for heating the passenger compartment and the second evaporator are traversed successively in that order by an airflow to be cooled or to be heated.

BRIEF DESCRIPTION OF THE DRAWINGS

The characteristics and advantages of the invention will be set out in more detail in the description below, by referring to the attached drawings.

DESCRIPTION OF THE PREFERRED EMBODIMENTS

Figure 1:
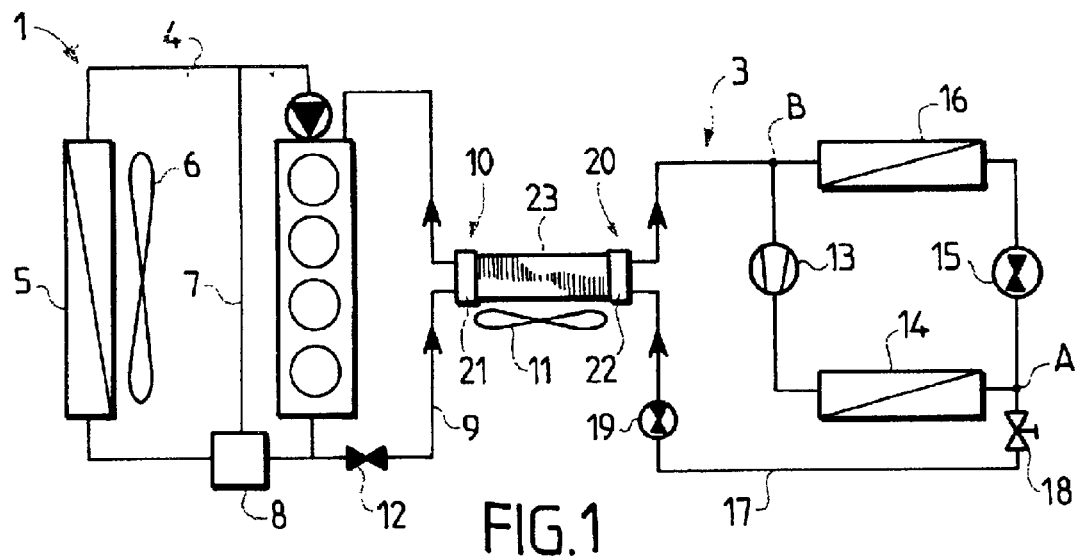
FIGS. 1 to 14 are diagrams of circuits relating to various embodiments of an air-conditioning device according to the invention.

FIG. 1 shows a heat-carrying fluid circuit 1 serving especially for cooling the drive engine 2 or a fuel cell of a motor vehicle and for heating the passenger compartment thereof, and a refrigerant-fluid circuit 3 serving for cold production in the passenger compartment. The circuit 1 comprises three branches in parallel between the outlet and the inlet of the engine 2, namely a first branch 4 containing a cooling radiator 5, associated with a fan 6, a second branch 7 allowing the fluid to return directly to the engine when the engine is cold, under the control of a thermostat 8, and a third branch 9 containing a heating radiator 10, associated with a fan 11, and a setting cock 12.

The circuit 3 conventionally contains a compressor 13, a condenser 14, a pressure-reducing valve 15 and a first evaporator 16 intended for extracting heat from an airflow to be sent into the passenger compartment.

According to the invention, to the refrigerant-fluid loop defined by the abovementioned components, there is added a supplementary branch 17 starting from a junction point A situated between the condenser 14 and the pressure-reducing valve 15, and arriving at a junction point B situated between the evaporator 16 and the compressor 13. The branch 17 successively contains a stop valve 18, a second pressure-reducing valve 19 and a second evaporator 20. Advantageously, but not necessarily, the radiator 10 and the evaporator 20 form part of a compound heat exchanger comprising two fluid chambers 21 and 22 arranged on either side of a bank of tubes 23 and supplied respectively with heat-carrying fluid and with refrigerant fluid. The exchanger 21-23 is, for example, of the type described in EP-A-964218, in which each tube has a U-shaped configuration the extremities of the two branches of which communicate with one of the fluid chambers, the tubes traversed by a fluid being arranged alternately with those traversed by the other fluid, in the longitudinal direction of the fluid chambers.

Depending on the need for cold, the stop valve 18 is either closed, allowing the fluid to flow only in the pressure-reducing valve 15 and the evaporator 16, or open, allowing the fluid to flow in parallel in the two pressure-reducing valves and in the two evaporators. In this latter case, the setting cock 12 is in closed position.

The heat-carrying fluid circuit represented in FIGS. 2 and 4 to 6 is identical to that of FIG. 1, and will therefore not be described again. As for the refrigerant-fluid circuit 3 represented in FIG. 2, it differs from that of FIG. 1 essentially by the insertion of a three-channel valve 30 between the compressor 13 and the condenser 14, the third channel of the valve 30 being linked via a pressure-reducing valve 31 to a junction point C situated on the branch 17 between the pressure-reducing valve 19 and the evaporator 20. An anti-return valve 32 is interposed, moreover, between the evaporator 16 and the junction point B, preventing any flow from this point towards the evaporator.

The three-channel valve 30 makes it possible to put the outlet of the compressor 13 in communication either with the inlet of the condenser 14, or with that of the evaporator 20, via the pressure-reducing valve 31. In the first case, the circuit functions in the same way as that of FIG. 1. In the second case, the compressor, the pressure-reducing valve 31 and the evaporator 20 form an additional heating loop in which the fluid flows in the gaseous state and the evaporator serves as heat source, as described in FR-A-2 717 126. Depending on the requirements for heat or for cold, and under the control of the valves 18 and 30, the evaporator 20 can therefore either not receive any fluid, or serve as an additional cold source for high cooling power, or serve as a top-up heat source for high heating power.

Figure 2:
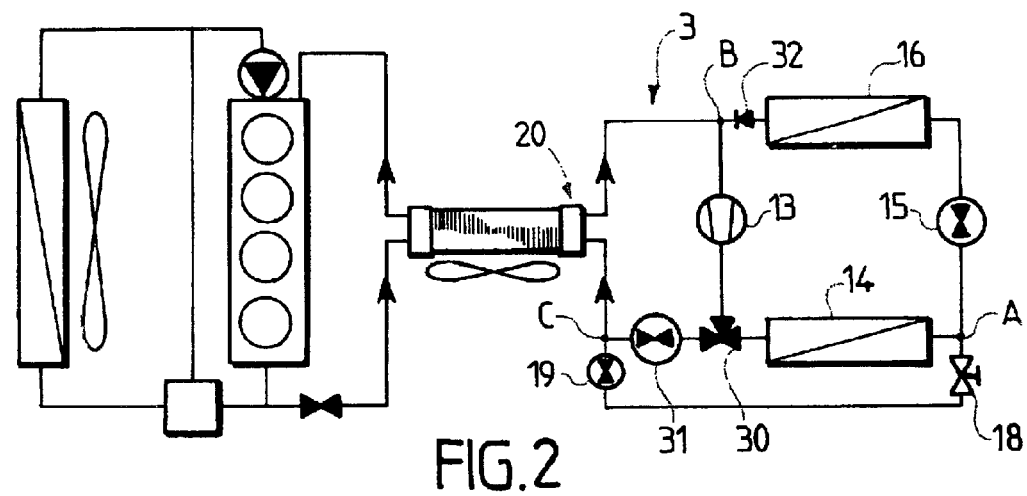
Figure 3:
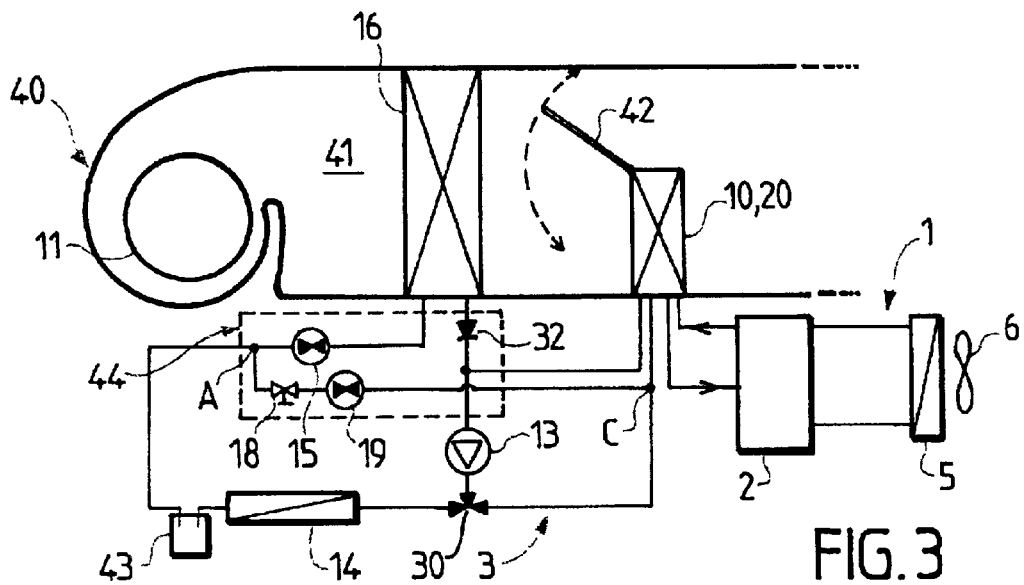

FIG. 3 shows a heat-carrying fluid circuit 1 similar to that of FIGS. 1 and 2, in a simplified representation, a refrigerant-fluid circuit 3 which is a variant of that of FIG. 2, and a part of the circuit 40 for the airflow to be treated in order to be sent into the passenger compartment of the vehicle. The circuit 40 comprises a duct 41 into which the outlet from the fan 11 opens out and in which are arranged successively, downstream of the fan, the first evaporator 16 and the compound heat exchanger 10, 20, a pivoting flap 42 making it possible to channel the whole of the airflow through the compound exchanger or to let a variable throughput pass outside of it. The adjusting flap 42 thus varies the heating power transmitted by the radiator 10 to the airflow, and replaces the setting cock 12.

In FIG. 3 are again found the engine 2 of the vehicle, the cooling radiator 5 and the associated fan 6. All the elements of the refrigerant-fluid circuit 3 of FIG. 2 are seen again here, with the exception of the pressure-reducing valve 31, which is not necessary given that the evaporator 20 is capable of withstanding the pressure of the gas coming from the compressor 13. A reservoir-dehydrator 43, omitted from FIGS. 1, 2 and 4 to 6, is arranged between the outlet of the condenser 14 and the junction point A. Moreover, a frame 44 in dashed line surrounds a certain number of components of the circuit 3 which are advantageously produced in the form of a unit module, namely the pressure-reducing valves 15 and 19, the valve 18 and the anti-return valve 32. The module 44 also contains the junction points A and B, and features inlet and outlet orifices for connecting it to the inlet of the compressor 13, to the outlet of the condenser 14, to the inlet and to the outlet of the evaporator 16, to the junction point C and to the outlet of the evaporator 20.

Figure 4:
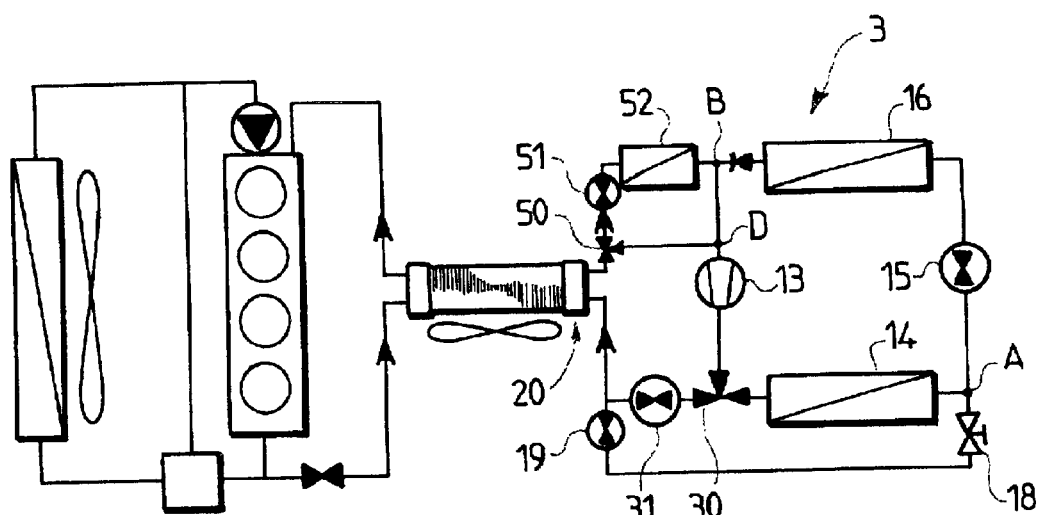

The circuit 3 represented in FIG. 4 differs from that of FIG. 2 by the addition of the following elements. A three-channel valve 50, a pressure-reducing valve 51 and a supplementary heat exchanger 52 are interposed in that order between the outlet of the evaporator 20 and the junction point B. The third channel of the valve 50 is linked to a junction point D situated between the point B and the inlet of the compressor 13. When the evaporator 20 is used as cold source jointly with the evaporator 16, the valve 50 links its outlet to point D, and the operation of the circuit is identical to that described above. In contrast, when the evaporator 20 is used as heat source, the refrigerant fluid flows in the compressor 13, in the pressure-reducing valve 31 if appropriate, in the evaporator 20, in the pressure-reducing valve 51 and in the supplementary exchanger 52, the latter extracting heat from an outside environment such as the atmosphere outside the vehicle or the engine cooling fluid, so that the circuit functions as a heat pump.

Figure 5:
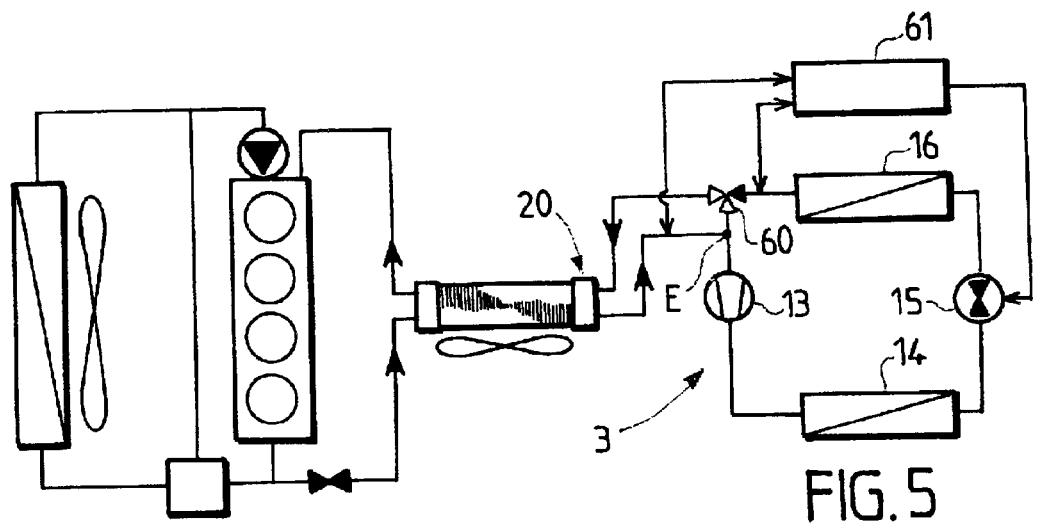

The basic loop formed by the compressor 13, the condenser 14, the pressure-reducing valve 15 and the evaporator 16 are found again in FIG. 5. A three-channel valve 60 is interposed between the outlet of the evaporator 16 and the inlet of the compressor 13, its third channel being linked to the inlet of the second evaporator 20, while the outlet of the latter is linked to a junction point E situated between the valve 60 and the inlet of the compressor. The valve 60 can link the outlet of the evaporator 16 either to the point E, or to the inlet of the evaporator 20. In the first case, the latter is not supplied with fluid. In the second case, it is supplied in series with the evaporator 16 and thus serves as top-up cold source. Advantageously, a regulation unit 61 acts on the pressure-reducing valve 15 in order to set the pressure and/or the throughput of the fluid as a function of the temperature and/or of the pressure sampled at the outlet from the evaporator 16 and/or at that of the evaporator 20.

Figure 6:
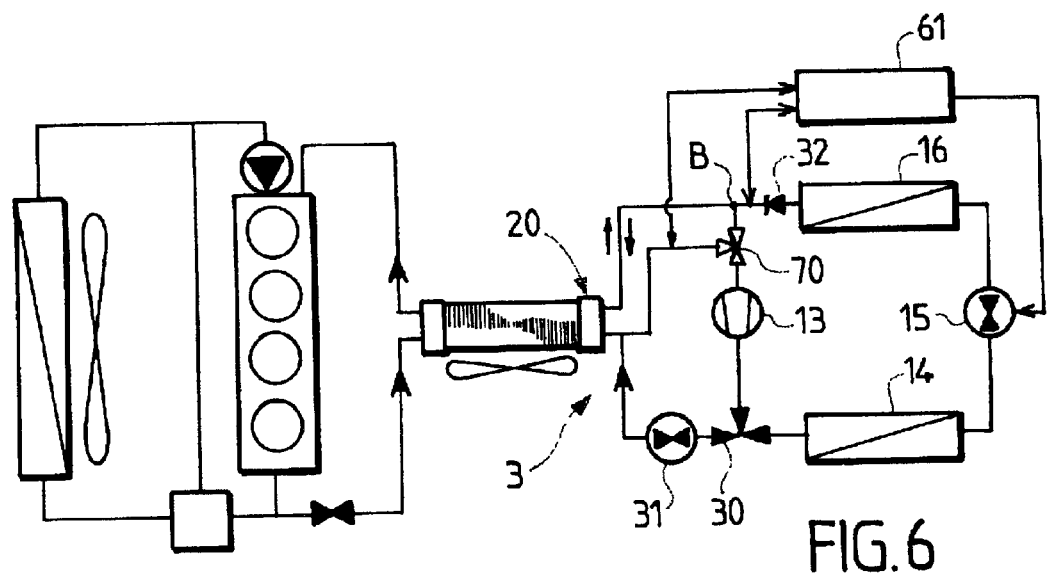

The refrigerant-fluid circuit 3 illustrated in FIG. 6 differs from that of FIG. 5 by the presence of a three-channel valve 30, of a pressure-reducing valve 31 and of an anti-return valve 32 which are produced and arranged as in the circuit of FIG. 2. Moreover, the three-channel valve 60 is replaced by a simple junction point B and a three-channel valve 70 replaces the junction point E. When the three-channel valve 30 puts the outlet of the compressor 13 in communication with the inlet of the condenser 14, the circuit functions like that of FIG. 5, depending on the position of the valve 70. When the inlet and the outlet of the compressor 13 are put into communication respectively, via the valves 70 and 30, with the two ends of the evaporator 20, the latter serves as heat source. The direction of circulation of the fluid there is then the reverse of the circulation direction when it serves as cold source.

Figure 7:
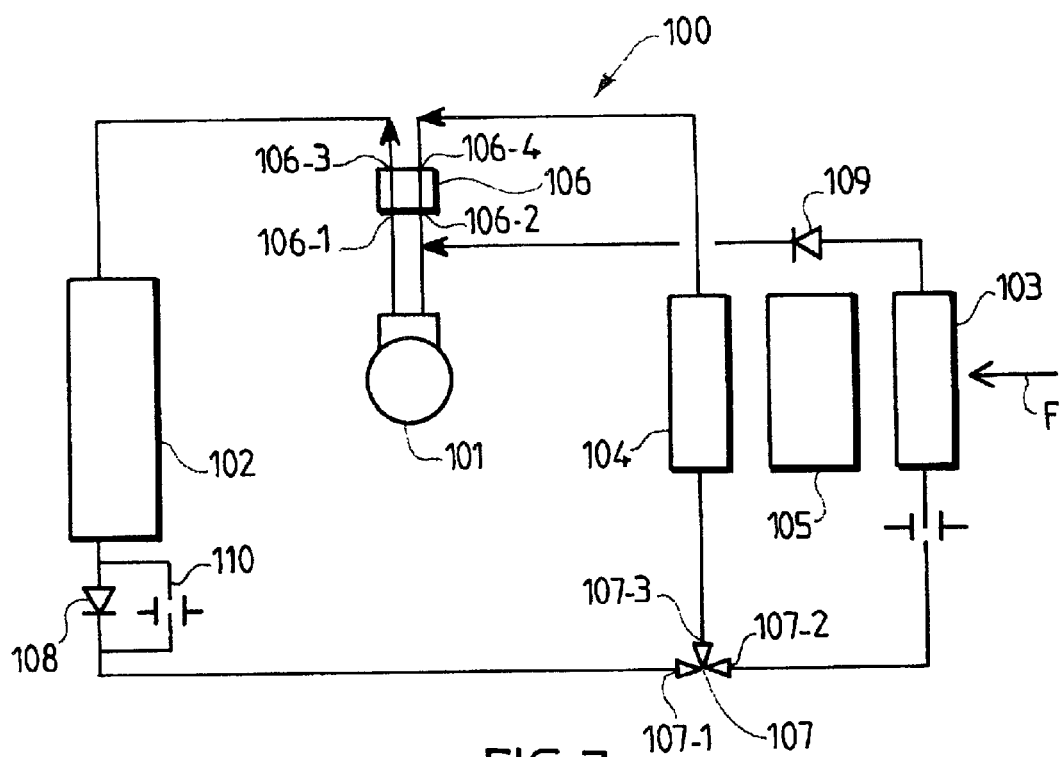
Figure 8:
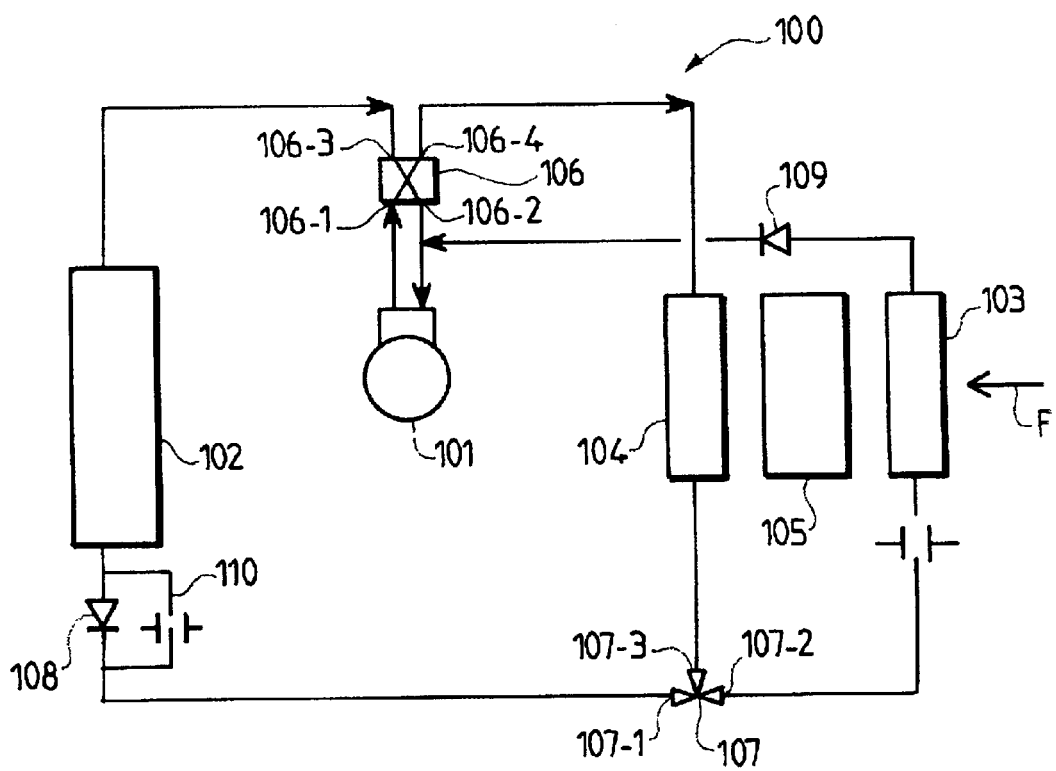

FIGS. 7 and 8 show a refrigerant-fluid circuit 100 comprising a compressor 101, a condenser 102, a first evaporator 103 and a second evaporator 104. A heating radiator 105, independent, in the present case, of the second evaporator 104, is interposed between the first and second evaporators on the path of an airflow F to be sent into the passenger compartment of the vehicle. A four-channel valve 106 has two of its channels 106-1 and 106-2 linked respectively to the outlet and to the inlet of the compressor 101. The condenser 102 is connected between a third channel 106-3 of the valve 106 and a first channel 107-1 of a three-channel valve 107. The first evaporator 103 is connected between a second channel 107-2 of the valve 107 and the inlet of the compressor, jointly with the channel 106-2. Finally, the second evaporator 104 is connected between the third channel 107-3 of the valve 107 and the fourth channel 106-4 of the valve 106. Anti-return valves 108, 109 are arranged between the condenser 102 and the valve 107, in the direction of the latter, and between the evaporator 103 and the compressor, in the direction of the latter.

In the configuration illustrated in FIG. 7, the channels 106-1 and 106-2 of the valve 104 are linked respectively to the channels 106-3 and 106-4, and the channel 107-1 of the valve 107 is linked to its two other channels. The fluid leaving the compressor thus flows in the condenser, then in parallel in the two evaporators, thus producing maximum cooling power. The channel 107-1 of the valve 107 can also be linked to only one of its outlets 107-2 and 107-3, allowing the fluid to flow in only one of the two evaporators. The benefit of being able to supply one or other of the evaporators at will, in addition to being able to supply them both simultaneously, is twofold. On the one hand, it is possible thus to supply the two evaporators alternately, which, when there is no need to make the two evaporators function simultaneously, avoids maintaining a dead space in which the lubricating oil circulating normally with the refrigerant fluid would accumulate. On the other hand, it is possible, when the two evaporators are of different sizes and consequently of different cooling capacities, to choose at any moment which of them is best adapted to the cold-production requirements, or, as appropriate, best adapted to the quantity of refrigerant fluid available in the event of under-filling. In this case, in fact, by reducing the size of the evaporator, more time is required to obtain the desired temperature, but, on the other hand, the problems of thermal imbalance in the evaporator, and consequently in the passenger compartment, are avoided.

In the configuration illustrated in FIG. 8, the channels 106-1 and 106-2 of the valve 106 are linked respectively to the channels 106-4 and 106-3, and the channel 107-3 of the valve 107 communicates with the two other channels 107-1 and 107-2. The fluid leaving the compressor 101 then flows first of all in the evaporator 104, which then plays the role of condenser, then in parallel in the condenser 102, which then plays the role of evaporator, passing into a bypass duct 110 arranged in parallel with the anti-return valve 108, and into the evaporator 103, before returning to the compressor. The loop containing the evaporator 104 and the condenser 102 functions in heat-pump mode, the evaporator 104 providing additional heating of the airflow F. Although this airflow is first of all cooled by the evaporator 102 before being heated up, this configuration is beneficial since, here again, it makes it possible to avoid oil accumulating in a dead branch since the fluid is circulating simultaneously in all the branches of the circuit.

Figure 9:
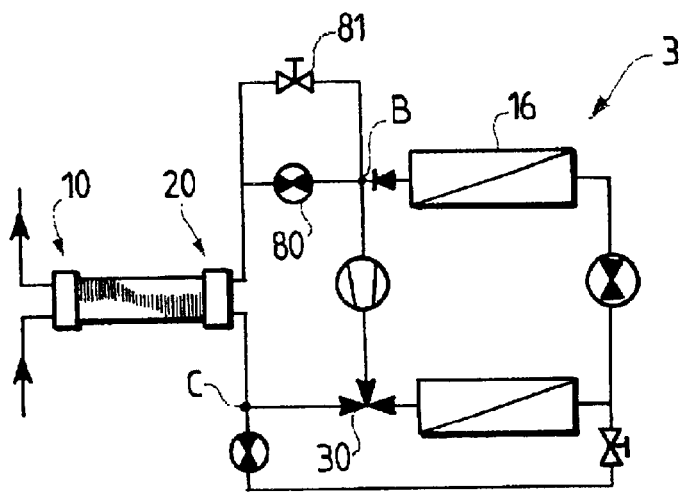
Figure 11:
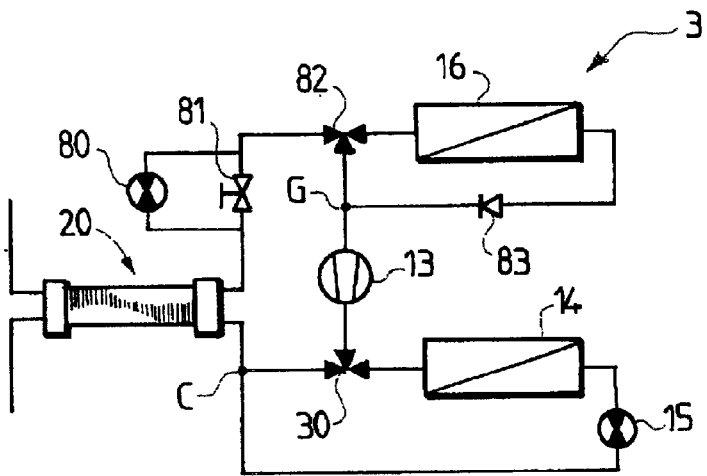
Figure 12:
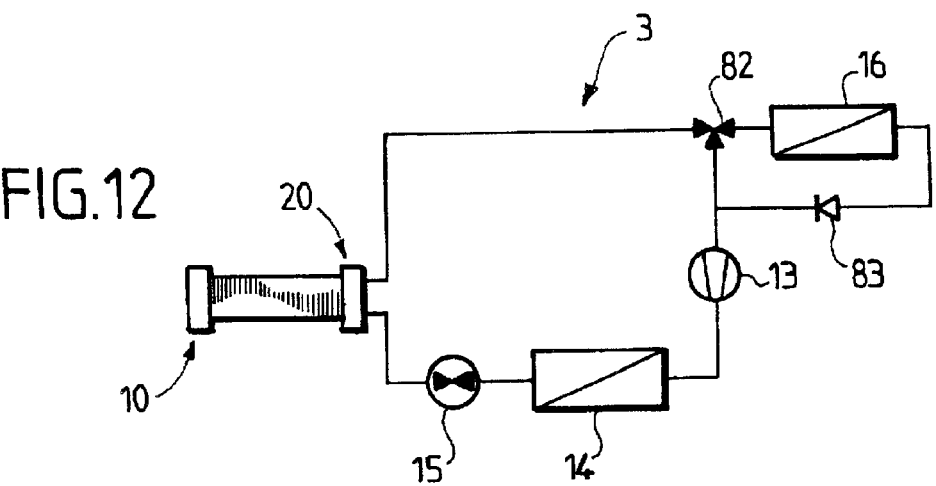

FIGS. 9, 11 and 12 show embodiments of the refrigerant-fluid circuit 3 capable of being used in place of those of FIGS. 1 to 6.

The circuit of FIG. 9 differs from that of FIG. 2 in that the pressure-reducing valve 31 is replaced by a pressure-reducing valve 80 arranged between the outlet of the evaporator 20 and the junction point B, in parallel with a stop valve 81. When the evaporator 20 is functioning as heat source, the valve 81 is closed and the fluid passes through the pressure-reducing valve 80 so as to undergo pressure reduction downstream of the evaporator 20, thus avoiding overheating the compressor. When the evaporator 20 is functioning as cold source, the valve 81 is open and the fluid does not pass through the pressure-reducing valve 80.

Figure 10:
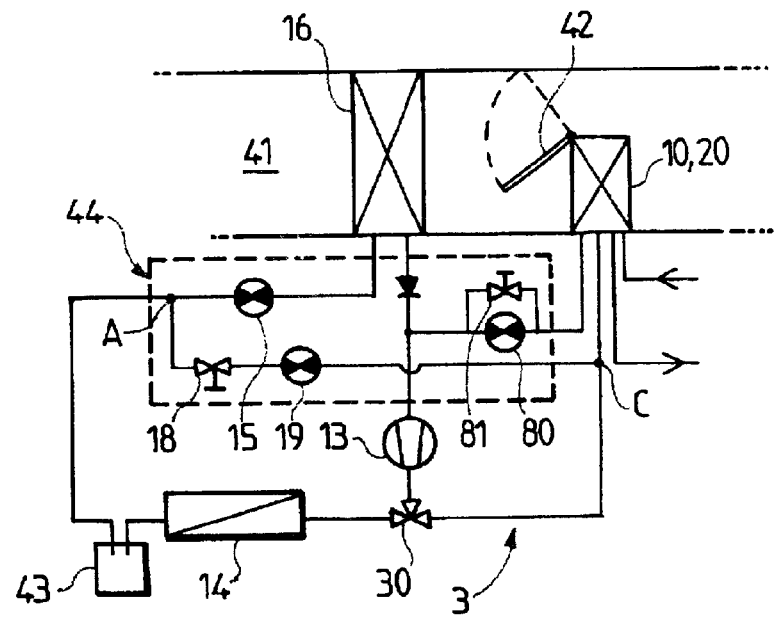

FIG. 10 is a view similar to FIG. 3, incorporating the circuit 3 of FIG. 9, certain elements of the air circuit 40 being omitted. The pressure-reducing valve 80 and the valve 81 are included in the module 44, which is connected to the rest of the system in the same way as that of FIG. 3.

The circuit 3 of FIG. 11 comprises an additional heating loop similar to that of FIG. 9, comprising the compressor 13, the evaporator 20 and the pressure-reducing valve 80 in parallel with the valve 81. In this loop, here again, the valve 30 is linked, on the one hand, to the outlet of the compressor, on the other hand to the inlet of the evaporator 20, by way of the junction point C. The third channel of the valve 30 is linked to the inlet of the condenser 14, the outlet of which is linked to the point C by way of the pressure-reducing valve 15 of the air-conditioning loop. Another three-channel valve 82 is interposed on the additional heating loop, between the outlet of the pressure-reducing valve 80 and the inlet of the compressor 13. As for the evaporator 16, it is linked, on the one hand, to the third channel of the valve 82, and on the other hand to a junction point G situated between the valve 82 and the inlet of the compressor. An anti-return valve 83 allows the fluid to flow in the evaporator 16 only in the direction from the valve 82 towards the point G. In this circuit, in air-conditioning mode, the fluid flow either in the evaporator 20 alone, or successively in it and in the evaporator 16.

This also goes for the simplified circuit 3 of FIG. 12, which does not include an additional heating loop. By comparison with the circuit of FIG. 11, the pressure-reducing valve 80 and the valve 81 are dispensed with, as well as the valve 30 and the branch linking it to the point C, the outlet of the compressor being linked directly to the inlet of the condenser.

Figure 13:
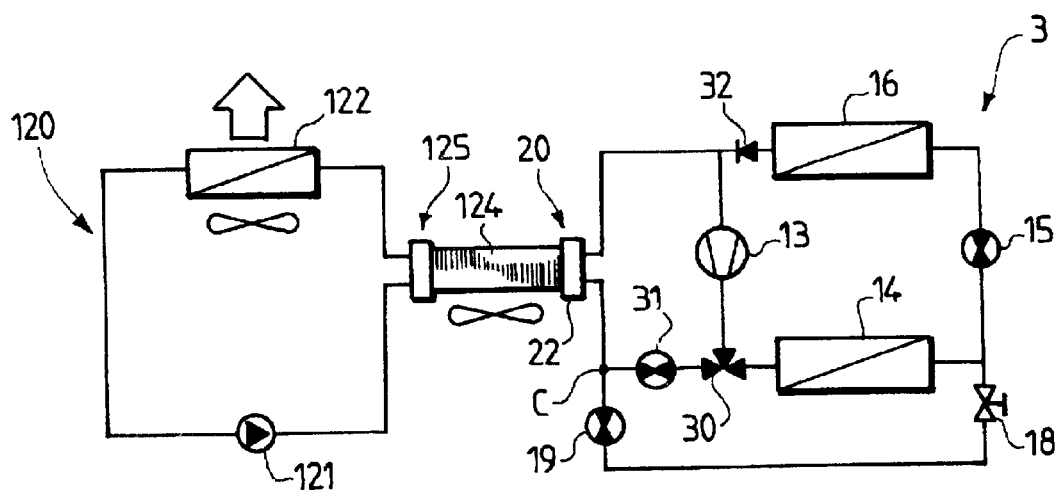
Figure 14:
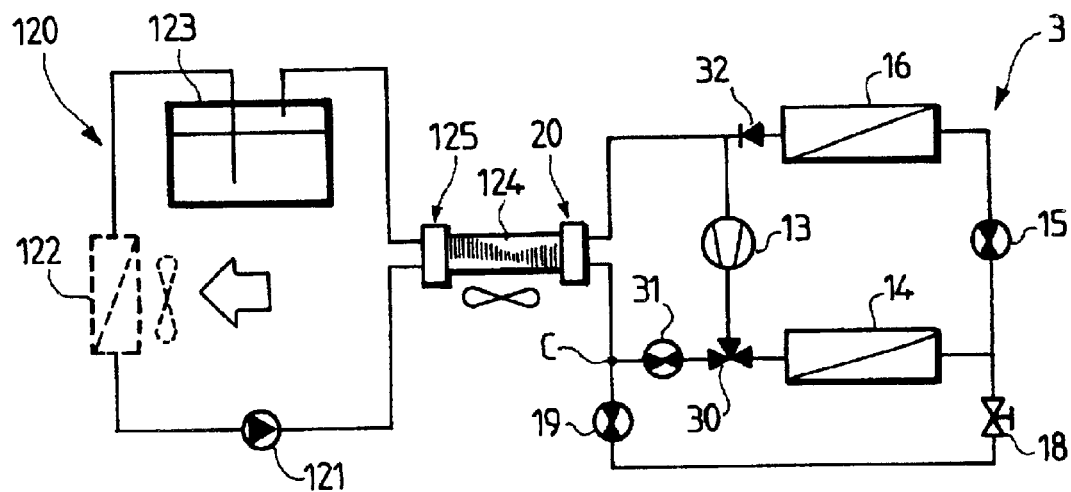

FIGS. 13 and 14 represent a refrigerant-fluid circuit 3 similar to that of FIG. 2, associated, by way of a compound heat exchanger 124, with different heat-carrying fluid circuits.

The heat-carrying fluid circuit 120 of FIG. 13 is a loop comprising a first heat exchanger 125 which, with the evaporator 20, forms the compound exchanger 124 in which the heat-carrying fluid and the refrigerant fluid exchange heat, a circulation pump 121 and another heat exchanger 122 serving to heat up or cool down a region of the passenger compartment of the vehicle other than that into which the airflow passing through the exchanger 124 is sent.

The loop 120 of FIG. 14 also comprises a pump 121 as well as a thermally insulated fluid reservoir 123 making it possible to store heat or cold. A heat exchanger 122 similar to that of FIG. 13 is provided as an option.

Each of the heat-carrying fluid circuits of FIGS. 1 to 6, 13 and 14 can be associated with each of the refrigerant-fluid circuits of FIGS. 1 to 6 and 12 to 14.

We claim:

1. A device for air-conditioning the passenger compartment of a motor vehicle, comprising:

a refrigerant-fluid circuit including a compressor, a condenser serving as a heat sink and a first evaporator serving as a cold source, the device further including a heating radiator and a second evaporator and switching means for selectively routing fluid flow between one of and both the first and second evaporators depending on a required cooling power for selectively causing the second evaporator to function as one of another cold source and a heat source, the first and second evaporators being traversed one after the other at least partly by an airflow to be cooled;

wherein said heating radiator and said second evaporator form a compound heat exchanger comprising two fluid chambers arranged on either side of a bank of tubes; and wherein the switching means include means provided for selectively establishing an additional heating loop, the additional heating loop includes the second evaporator and does not include the condenser nor the first evaporator, the second evaporator is provided to serve as the heat source if the additional heating loop is established.

2. The device of claim 1, in which the switching means are able to make the fluid flow only in the second evaporator.

3. The device of claim 2, in which the switching means are able to make the fluid flow alternately in the first and second evaporators.

4. The device of claim 2, in which the first and second evaporators have different cold-production capacities.

5. The device of claim 1, in which the additional heating loop further contains, between the second evaporator and the compressor, a pressure-reducing valve followed by a supplementary heat exchanger able to extract heat from an outside environment, and operates as heat pump.

6. The device of claim 5, in which means are provided for allowing the fluid to circumvent the supplementary heat exchanger and the associated pressure-reducing valve when it is flowing in the two evaporators.

7. The device of claim 1, in which the first and second evaporators are arranged mutually in parallel in the circuit.

8. The device of claim 1, in which one of the first and second evaporators forms, with a radiator for heating the passenger compartment, a compound heat exchanger in which an airflow to be cooled or to be heated is in thermal contact both with a refrigerant fluid of the circuit and with a heat-carrying fluid supplied to the radiator.

9. The device of claim 8, in which the said compound heat exchanger comprises two fluid chambers supplied respectively with the refrigerant fluid and with the heat-carrying fluid, which are arranged at opposite ends to one another with respect to a bank of tubes, each tube having a U-shaped configuration in which the ends of the two branches communicate with one of the fluid chambers in such a way as to be traversed by the corresponding fluid, the corresponding fluid being alternately the refrigerant fluid and the heat-carrying fluid in the direction of the airflow.

* * * * *